Figure 1:
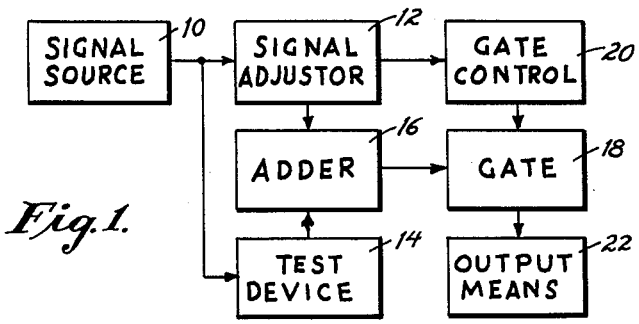

Jan. 15, 1963   D. E. SUNSTEIN ETAL   3,074,017
MEANS FOR TESTING RISE TIME AND DELAY CHARACTERISTICS
Filed Jan. 22, 1958   2 Sheets-Sheet 1

INVENTORS.
DAVID E. SUNSTEIN
GEORGE J. LAURENT
RAY A. ZUCK
BY Trachtman + Zoda
ATTORNEYS.

3,074,017
Patented Jan. 15, 1963

3,074,017
MEANS FOR TESTING RISE TIME AND
DELAY CHARACTERISTICS
David E. Sunstein, Bala-Cynwyd, George J. Laurent,
Jenkintown, and Ray A. Zuck, Lafayette Hill, Pa., assignors to General Atronics Corporation, Bala-Cynwyd,
Pa., a corporation of Pennsylvania
Filed Jan. 22, 1958, Ser. No. 710,445
29 Claims. (Cl. 324—158)

The invention relates to testing means more particularly to testing means for testing devices such as transistors.

Heretofore cathode ray tube observations have been utilized for measuring the characteristics of components such as transistors for the purpose of determining delay, rise time and other characteristics. The testing means of the invention allows automatic testing of the delay and rise time characteristics of components such as transistors, thereby increasing the accuracy and speed at which these operations can be performed.

It is therefore the object of the invention to provide a new testing means for determining the characteristics of test devices.

Another object of the invention is to provide a new and improved testing means which automatically, efficiently and speedily determines the characteristics of a device under test.

Another object of the invention is to provide a new and improved testing means which efficiently descriminates between acceptable and unacceptable characteristics in a test device.

Another object of the invention is to provide a new and improved testing means for determining, selecting and distributing devices being tested according to their characteristics.

Another object of the invention is to provide a new and improved testing means responsive to the combined characteristics of delay and rise time of a device being tested.

Another object of the invention is to provide a new and improved testing means for determining characteristics of a device being tested by comparing the input signal with its output signal.

Another object of the invention is to provide a new and improved testing means for determining the characteristics of a device being tested corresponding to the signals being delivered through the device.

Another object of the invention is to provide a new and improved measuring device which may be adjusted for measuring the rise time, delay or combination of rise time and delay characteristics of the device being tested.

Another object of the invention is to provide a new and improved testing means which is highly critical at the point defining the acceptable and unacceptable characteristics, lending great precision to the testing means.

Another object of the invention is to provide a new and improved testing means which is highly sensitive, and provides highly accurate readings or indications of the characteristics of the device being tested.

Another object of the invention is to provide a new and improved means which is highly adaptable for comparing wave forms and testing the characteristics of various devices.

Another object of the invention is to provide a new and improved testing means which allows the selection of a particular region of the characteristic curve of the device being tested for detection by the testing means.

Another object of the invention is to provide a new and improved testing means which is efficient, automatic, reliable and rapid in action.

Another object of the invention is to provide a new and improved testing means providing the characteristics of the device being tested with respect to either leading or trailing edges of a test pulse.

Another object of the invention is to provide a new and improved testing means which is substantially drift-free and substantially insensitive to power supply variations in voltage.

The above objects of the invention are achieved by providing a testing means comprising a source of signals, means for delivering signals from the source to the device which is to be tested, and a signal comparing means for receiving signals from the source and from the device and delivering an output signal responsive to the characteristics of the device being tested.

The foregoing and other objects of the invention will become more apparent as the following detailed description of the invention is read in conjunction with the drawings, in which:

FIGURE 1 diagrammatically illustrates in block form a testing means embodying the invention.

Figure 2:
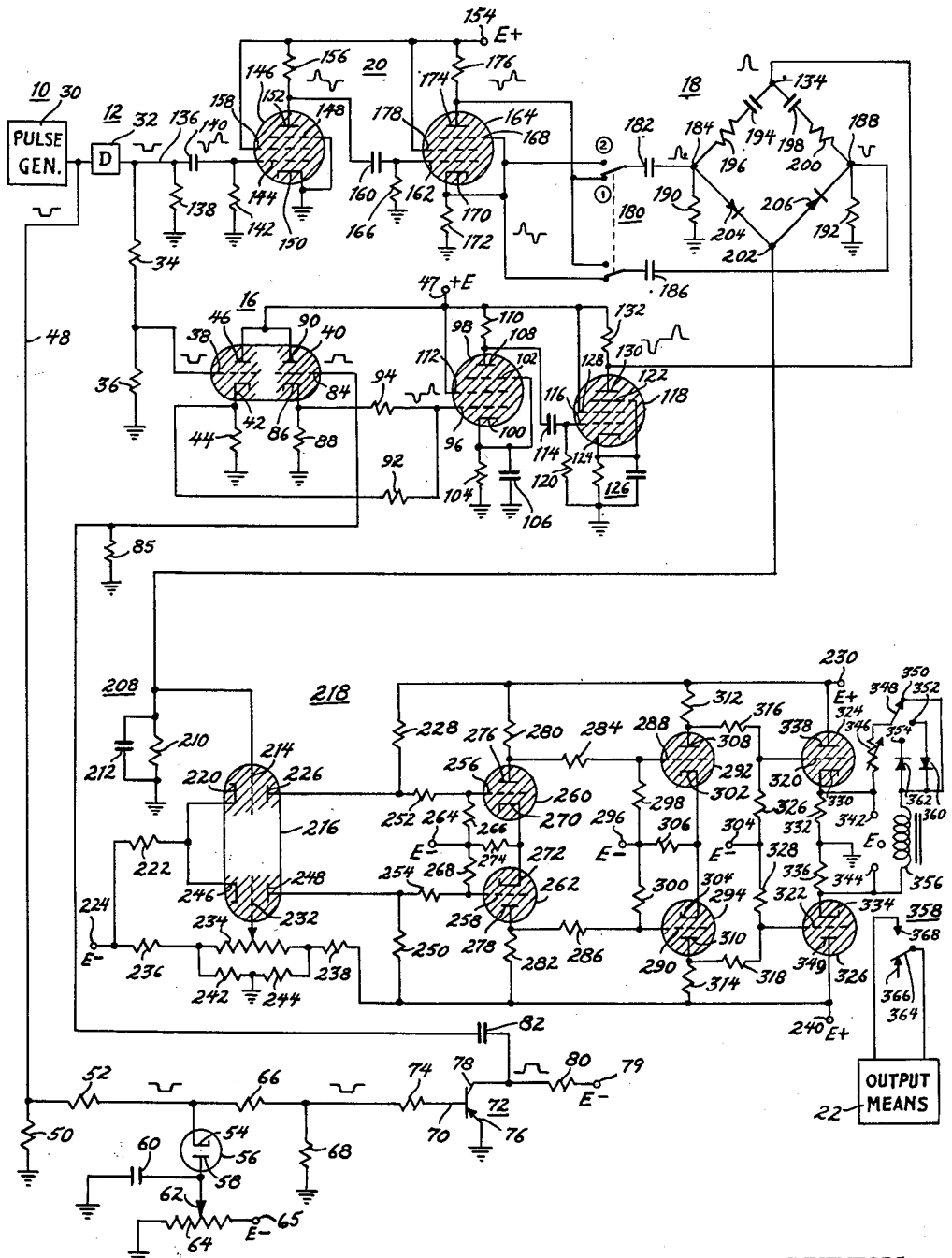

FIGURE 2 is a diagrammatic representation in schematic form of the invention represented in FIGURE 1, and FIGURES 3, 4, 5 and 6 diagrammatically illustrate signal wave forms of the testing means shown in FIGURE 2.

Like reference numerals designate like parts throughout the several views.

The FIGURE 1 is a diagrammatic representation in block form of a testing means embodying the invention. A source of signals 10 delivers signals to a signal adjustor 12 and a device 14 being tested. The signal adjustor 12 and test device 14 respectively deliver output signals to the input leads of an adder 16. The adder 16 delivers its output signal to a gate 18 which is controlled by a gate control 20. The gate control 20 is excited by signals from the signal adjustor 12 for controlling the delivery of signals from the adder 16 through the gate 18 to an output means 22.

In operation, the testing means delivers signals from a common source 10 to an adder 16 through the signal adjustor 12 and the test device 14. The polarities of the output signals from the adjustor 12 and test device 14 are such that the adder delivers an output signal which reflects the characteristics of the output signal from the test device 14. The signal adjustor also activates the gate control 20 for selecting the portion of the output signal from the adder 16 which is to be delivered to the output means 22.

Refer now to the FIGURE 2 for a description in greater detail of the testing means shown in block form by FIGURE 1. The signal source 10 which may be a pulse generator 30 of the square wave type delivers negative going pulses to the signal adjustor 12. The signal adjustor 12 may be a delay element 32 providing a delay of a predetermined period. The delay element 32 may be in the form of a coaxial cable having distributed impedance or of the lumped type delay line.

The output from the delay element 32 is returned to ground potential through series resistors 34 and 36. The junction of resistors 34 and 36 is connected to the control electrode 38 of a double triode valve 40. The cathode 42 associated with the control electrode 38 is returned to ground potential through a load resistor 44, while the anode 46 is connected to a positive potential terminal 47.

The output from the pulse generator 30 is also delivered over a line 48 to the junction of a resistor 50 connected to ground potential and a resistor 52 joined to the cathode 54 of a diode clipping valve 56. The anode 58 of the diode 56 is returned to ground potential by a by-pass capacitor 60 and connected to the moveable arm 62 connected with a potentiometer resistor 64 which is bridged between ground potential and a negative potential terminal 65.

The cathode 54 of diode 56 is also connected through resistors 66 and 68 to ground potential and to the base electrode 70 of a transistor 72 through the series resistors 66 and 74.

The emitter electrode 76 of transistor 72 is returned to ground potential, while the collector 78 is returned to a negative potential terminal 79 through load resistor 80. The collector 78 of transistor 72 is also coupled through a capacitor 82 with the control electrode 84 of the valve 40 of the adder circuit 16. The electrode 84 is returned to ground by a grid resistor 85.

The cathode 86 associated with the control electrode 84 of the valve 40 is returned by a load resistor 88 to ground potential, while the anode 90 is directly connected to the positive potential terminal 47.

The cathodes 42 and 86 of valve 40 are respectively connected by resistors 92, 94 with the control electrode 96 of an amplifier valve 98. The cathode 100 and the suppressor electrode 102 are returned to ground potential through the resistor 104 in parallel with the capacitor 106, while the anode 108 is returned to the positive potential terminal 47 through a load resistor 110. The screen electrode 112 is also directly returned to the positive potential terminal 47.

The anode 108 of the valve 98 is connected through a coupling capacitor 114 to the control electrode 116 of an amplifier valve 118. The control electrode 116 is returned to ground potential through a grid resistor 120. The suppressor electrode 122 of valve 118 is connected with the cathode 124 and returned to ground potential through the parallel resistor capacitor combination 126. The screen electrode 128 is directly connected with the positive potential terminal 47, while the anode 130 of valve 118 connects through a load resistor 132 to the positive potential terminal 47.

The anode 130 of the valve 118 is also connected with the input terminal 134 of the gating circuit 18.

The negative pulses from the delay element 32 also are delivered to a line 136 which is bridged to ground potential by a resistor 138. Line 136 is also connected to ground potential by a differentiating capacitor 140 connected in series with a resistor 142. The junction of the capacitor 140 and resistor 142 is directly connected with the control electrode 144 of an amplifier valve 146 of the gate control circuit 20.

The suppressor electrode 148 and cathode 150 of the valve 146 are grounded, while the anode 152 is returned to a positive potential terminal 154 through a load resistor 156. The screen electrode 158 is also directly linked with the terminal 154.

The anode 152 of valve 146 is connected by a coupling capacitor 160 with the control electrode 162 of a gate driver valve 164. The control electrode 162 is also returned to ground potential through a grid resistor 166. The suppressor electrode 168 and the cathode 170 of valve 164 are returned to ground potential through a load resistor 172, while the anode 174 is joined to the positive potential terminal 154 through a plate resistor 176. The screen electrode 178 is also returned directly to the terminal 154.

The anode 174 and cathode 170 of the valve 164 are respectively connected to a signal reversing switch means 180. When the switch means is in its first position, as illustrated in FIGURE 2, the anode 174 is connected through a coupling capacitor 182 with the input terminal 184 of the gate 18, while the cathode 170 is connected through a coupling capacitor 186 with the input terminal 188 of gate 18.

When the switching means 180 is in its second position, the connections of the anode 174 and cathode 170 of the valve 164 with the gate 18 are reversed.

The terminal 184 of gate 18 is returned to ground potential by a resistor 190, while the input terminal 188 is returned to ground potential by a resistor 192. The signal input terminal 134 of gate 18 is joined with the terminal 184 by a series capacitor 194 and resistor 196, and is joined with the terminal 188 by a series capacitor 198 and resistor 200. The input terminal 184 of gate 18 is connected with the output terminal 202 by a crystal diode 204 which is poled to deliver current to the output terminal 202. The input terminal 188 of gate 18 is also joined with the output terminal 202 by a crystal diode 206 which is poled to deliver current from the terminal 202 to the terminal 188.

The output terminal 202 is connected to ground potential by a signal averaging network 208 comprising a resistor 210 in parallel with a capacitor 212.

The output terminal 202 of the gate 18 is also connected to the control electrode 214 of a twin triode valve 216 of a differential direct current amplifier 218. The cathode 220 associated with control electrode 214 of valve 216 is returned through a cathode resistor 222 to a negative potential terminal 224, while the anode 226 returns to the positive potential terminal 230 through a plate resistor 228. The control electrode 232 of the valve 216 is returned to a variable tap on a potentiometer resistor 234 having one end connected to the negative potential terminal 224 through a resistor 236 while its other end is connected through resistor 238 to a positive potential terminal 240. The ends of the potentiometer resistor 234 are also connected to ground potential by respective resistors 242 and 244.

The cathode 246 of valve 216 associated with the control electrode 232 is joined with the cathode 220, while the anode 248 is connected to the positive potential terminal 240 by a plate resistor 250.

The anodes 226, 248 of the valve 216 are connected respectively by resistors 252, 254 to the control electrodes 256, 258 of the triode valves 260, 262 of the amplifier 218. The control electrodes 256, 258 are respectively returned to a negative potential terminal 264 by grid resistors 266 and 268. The cathodes 270, 272 of valves 260, 262 are also returned by a common resistor 274 to the terminal 264, while their anodes 276, 278 are respectively connected by load resistors 280, 282 to the positive potential terminals 230, 240.

The anodes 276, 278 of the valves 260, 262 are respectively coupled by resistors 284, 286 with the control electrodes 288, 290 of triode valves 292, 294 of the amplifier 218. The control electrodes 288, 290 of valves 292, 294 are returned to negative potential terminal 296 by respective grid resistors 298, 300. The cathodes 302, 304 of valves 292, 294 are connected by a common resistor 306 with the negative potential terminal 296, while the anodes 308, 310 are respectively returned to the positive potential terminals 230, 240 by load resistors 312, 314. The anodes 308, 310 of valves 292, 204 are also respectively coupled by resistors 316, 318 with the control electrodes 320, 322 of the triode valves 324, 326 of the amplifier 218.

The control electrodes 320, 322 of valves 324, 326 are also returned to the negative potential terminal 304 by respective grid resistors 326, 328. The cathode 330 of valve 324 is connected to ground potential by resistor 332, while the cathode 334 of valve 326 is returned to ground potential by resistor 336. The anode 338 of valve 324 is directly connected to the positive potential terminal 230, while the anode 340 of valve 326 is directly connected to the positive potential terminal 240. The cathodes 330, 334 of the valves 324, 326 are respectively connected to the output terminals 342, 344 delivering the output signal $E_o$.

The output terminal 342 is connected through a variable resistor 346 to the contact arm 348 of a selector switch having contact terminals 350, 352 and 354. The contact terminal 350 is connected with the output terminal 344 through the activating coil 356 of a relay 358. The contact terminal 352 of the selector switch is connected to the terminal 350 by a crystal diode 360 poled to deliver current from the terminal 352 to the terminal 350, while the terminal 354 is connected with the terminal 350 by a crystal diode 362 poled to deliver current from the terminal 350 to the terminal 354.

The armature 364 of the relay 358 contacts an open terminal 366 when it is not energized, while it contacts the terminal 368 in its energized condition. The armature 364 when engaging the contact terminal 368 completes a circuit with the output means 22.

In operation, the pulse generator 30 produces substantially rectangular negative going signals at a repetition rate which may be 5 kilocycles and a rise time of ten millimicro-seconds. The pulse is delayed by the delay element 32 and delivered to the control electrode 38 of the valve 40 of the adder circuit 16. The negative going pulse reduces the current through the left hand portion of the valve 40 and results in a decrease in the voltage drop in the cathode resistor 44.

The negative going pulse from the pulse generator is also delivered by the line 48 to the clipper valve 56 which becomes conductive to limit the amplitude of the negative going signal. The potentiometer 64 may be adjusted to control the lower limit of the pulse signal. The pulse signal is then delivered to the base electrode 70 of the transistor 72 under test which produces a positive going pulse at its collector 78. The pulse from the collector 78 is delivered by the coupling capacitor 82 to the control electrode 84 of the valve 40 in the adder circuit 16. The positive going signal which is delivered to the control electrode 84 causes the right hand portion of valve 40 to increase its current conduction so that the voltage drop across the cathode resistor 88 increases.

When signals are not delivered to the control electrodes 38 and 84 of the valve 40, the voltage drops across the cathode resistors 44 and 88 are substantially equal. This signal potential is transmitted by the resistors 92 and 94 to the control electrode 96 of the amplifier valve 98. When negative going and positive going signals respectively are delivered to the control electrodes 38 and 84 of the valve 40, the voltage drop across the resistor 44 decreases while that across the cathode resistor 88 increases. If the voltage drop across the resistor 44 decreases in the same amount that the voltage drop across the resistor 88 increases, then the voltage delivered to the control electrode 96 of valve 98 remains constant. However, if the voltage drop across resistor 44 decreases while the voltage drop across resistor 88 remains constant, the potential at the control electrode 96 decreases and vice versa. In effect, the adder circuit adds the amplitudes of the negative-going and positive-going signals and delivers an output signal corresponding to their sum. If the negative-going and positive-going signals are identical in wave form, and opposite in phase, the output of the adder 16 will remain unchanged. However, should the positive and negative going signals differ in wave form, such as the rise time and duration, or in the simultaneity of their delivery to the adder 16, the adder output signal will reflect these relationships.

Figure 3A:
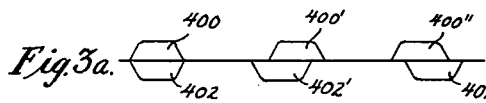

Referring to FIGURE 3a, the pulse 400 is schematically illustrated as a positive-going signal similar to that received by the control electrode 84 of the valve 40, while the negative-going signal 402 is the signal delivered to the control electrode 38 of the valve 40. It is noted that the pulses 400 and 402 are identical in shape, occur at the same time and differ only in the polarity. Under these circumstances, the adder 16 would deliver no output signal.

The signals 400' and 402' respectively correspond to the signals 400 and 402 and differ only in that the pulse 400' is delayed to occur after the beginning of the pulse 402'. The addition of these signals results first in a negative-going signal 404 produced by the leading edges of the pulses, and a positive-going pulse 406 produced by the trailing edges of the pulses 400' and 402' as shown in FIGURE 3b.

Figure 3B:
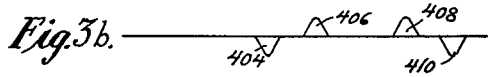
Figure 3C:
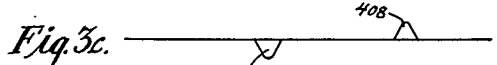
Figure 3D:
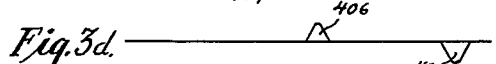

When the pulse 400" has its leading edge occur before the beginning of the pulse 402", the resultant output signal is a positive-going pulse 408 and a negative-going pulse 410 respectively corresponding to the leading and trailing edges of the pulses 400" and 402" as shown in FIGURE 3b. The FIGURE 3c shows the pulses produced by the leading portions of the pulses being compared by the adder 16, while the FIGURE 3d illustrates the pulses 406, 410 corresponding to the output related to trailing edges of the pulses being compared. From the FIGURES 3c and 3d it is evident that the polarity of the signals are reversed and their amplitude passes through zero value as the time relationship of the signals 400 and 402 are shifted with respect to each other.

Figure 4A:
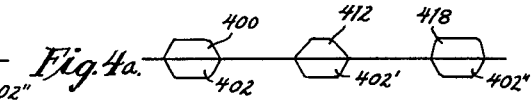
Figure 4B:
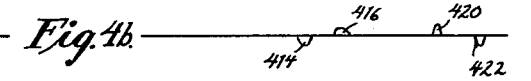
Figure 4C:
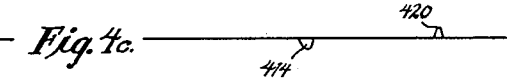
Figure 4D:

Referring to the FIGURE 4a, it is noted that when the positive-going pulse 412 from the transistor 72 has a longer rise time than the negative-going pulse 402', the difference is reflected in the negative-going pulse 414 and the positive-going pulse 416 of FIGURE 4b. When the pulse 418 from the transistor has a rise time shorter than that of the pulse 402", the positive-going pulse 420 and the negative-going pulse 422 are respectively generated by the leading and trailing edges as shown in FIGURE 4b. The FIGURE 4c shows the difference in polarities of the siegnals derived from the leading edges of the compared pulses, while the FIGURE 4d ilustrates the pulses 416 and 422 which are derived from the trailing edges of the compared signals. It is noted that the amplitudes of the signals in FIGURE 4c and 4d decrease as the negative-going and positive-going pulses which are compared approach identical configurations and that the polarity reverses when the rise time passes from less than to greater than the rise time of the negative-going signal with which it is being compared. This results in a highly critical method of determining with a high degree of precision the identical natures or slight variations between the signals being compared.

Figure 5A:
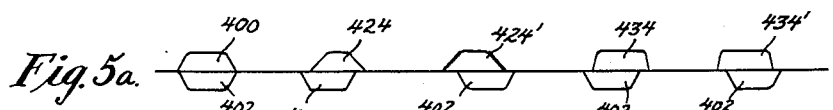
Figure 5B:
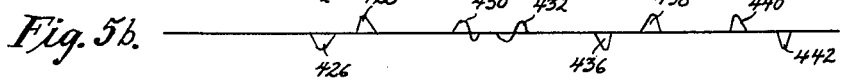

The FIGURES 5a, 5b, 5c and 5d illustrate graphically the conditions in which the signals to the adder circuit 16 vary both in time of their occurrence and their rise times which were separately illustrated in the FIGURES 3 and 4. When the signal 424 from the transistor 72 is both delayed with respect to the signal 402 and has a longer rise time, the resulting composite signals are shown in FIGURE 5b. The negative-going pulse 426 is a composite signal resulting from the leading edges of the compared pulses 424 and 402, while the positive-going signal 428 is produced by their trailing edges. When the signal 424' which has a wave form identical with signal 424, leads the occurrence of the signal 402, the signals 430 and 432 corresponding to the leading and trailing edges are produced as shown in the FIGURE 5b. The signal 430 comprises a positive-going component followed by a negative-going portion, while the signal 432 comprises first a negative-going portion followed by a positive-going portion.

When the signal 434 from the transistor 72 is delayed with respect to the signal 402 and has a shorter rise time, the adder circuit 16 first delivers a negative-going composite signal 436 corresponding to the leading edges and then a positive-going composite signal 438 corresponding to the trailing edges of the compared pulses. However, when the signal 434' is shifted to lead the occurrence of the pulse 402, the output pulses 440 and 442 are reversed in polarity as seen in FIGURE 5b.

Figure 5C:
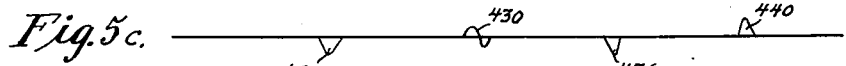
Figure 5D:
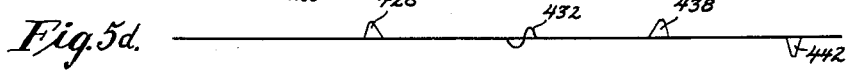

The FIGURE 5c illustrates each of the output signals of the adder 16 produced by adding the leading edges of the compared signals, while the FIGURE 5d provides the signals produced by adding the trailing portions of the compared signals. It is noted in comparing the output signals 430 and 426 that the advancement of the occurrence of signal 424' results in the introduction of the positive component of the output signal 430. It is also noted that when the rise time of the pulse 424 is reduced as in pulse 434, the comparison of the output signals 436 with 426 shows the reduction of the negative amplitude and duration of the signal 436. The shifting of the signal 434 so that it leads the signal 402 as shown by 434', results in the reversal of the polarity of its negative output signal 436 to positive signal 440.

The output from the adder 16 is delivered to the valve 98 which delivers an amplified signal to the output amplifier valve 118. The two stages of amplification result in an output signal from the valve 118 which has the same phase as the input signal to the valve 98. The output signal from the valve 118 is delivered to the input terminal 134 of the gate 18.

The gate 18 does not deliver an output signal at its terminal 202 until it receives appropriate gating signals at its terminals 184 and 188 from the gate control circuit 20.

The gate control circuit 20 derives negative-going pulses from the delay element 32. The signal differentiating circuit comprising the capacitor 140 and resistor 142 act upon the negative going signal to produce a negative-going pulse corresponding to its leading edge and a positive-going pulse corresponding to its trailing edge. The negative-going and positive-going pulses are amplified and inverted by the valve 146 and delivered to the driver valve 164. The output from the driver valve 164 is phase inverted, so that the positive-going signal first received increases the conduction of valve 164 and results in a negative-going signal at the anode 174 and a positive-going signal at the cathode 170 of valve 164. When the negative-going pulse is delivered following the positive-going pulse, conduction of the valve 164 is reduced resulting in a positive-going pulse at its anode 174 and a negative-going pulse at its cathode 170.

When the switching means 180 is in its first position as illustrated in FIGURE 2, the driver valve 164 first delivers the negative-going signal to the input terminal 184 and the positive-going signal to the input terminal 188 of the gate 18. This is followed by the delivery of the positive-going signal to the terminal 184 and the negative-going signal to the terminal 188 corresponding to the trailing edge of the negative-going pulse from the delay element 32.

When the switching means 180 is placed in second position with its armature contacting the upper terminals, the delivery of signals from the driver valve 164 to the gate 18 is reversed, so that the terminal 184 first receives a positive-going signal followed by a negative-going signal and the input terminal 188 of gate first receives a negative-going signal followed by a positive-going signal for each negative-going pulse from the delay element 32.

With the simultaneous occurrence of a negative-going pulse at the terminal 184 and a positive-going pulse at the terminal 188 the diodes 204 and 206 offer a high back resistance and prevent the flow of current therethrough. This inhibits the delivery of a signal from the input terminal 134 of the gate 18 to the output terminal 202. However, when a positive-going signal is delivered to the terminal 184 and a negative-going signal is delivered to the terminal 188 of gate 18, the diodes 204 and 206 become conductive and an output signal at terminal 202 is produced corresponding to the input signal at terminal 134. This is effected by means of the blocking capacitors 194 and 198 which are respectively connected in series with the resistors 196 and 200. Thus a decrease in the voltage of the input signal to the terminal 134 results in a decrease in the potential at the output terminal 202, while an increase in potential at the input terminal 134 is similarly reflected by an increase in potential at the output terminal 202 when the gate 18 is conducting.

It is noted that when the switching means 180 is set in its first position as illustrated in the FIGURE 2, the gate 18 becomes conductive upon the occurrence of the positive-going signal from the output valve 118 corresponding to the trailing signal derived from the comparison of the trailing edges of the compared pulses of the adder circuit 16. When the switching means 180 is placed in its second terminal position, the gate 18 conducts during the occurrence of the first or negative-going signal from the valve 118 corresponding to the signal derived from the comparison of the leading edges of the input pulses to the adder circuit 16.

Thus, it is noted that the switching means 180 selects a portion of the comparison signal which is to be passed by the gate 18. It is also noted that the duration of the gating signals from the driver valve 164 also affects the character of the signal passed by the gate 18. For example, refer to the FIGURES 6a and 6b.

Figure 6A:
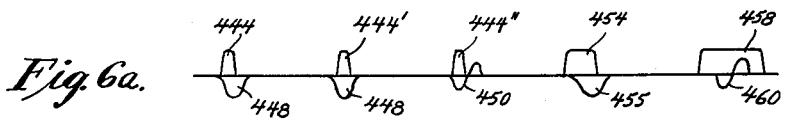
Figure 6B:
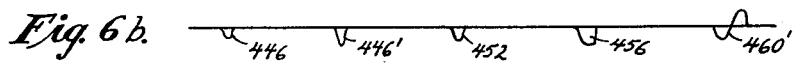
Figure 6C:
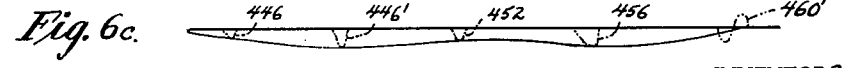

In FIGURES 6a and 6b a comparatively narrow gating pulse 444 allows the gate to pass a small portion 446 of the signal 448 at the input terminal 134. When the pulse 444' is shifted from the leading edge portion to the central portion of greatest amplitude of the input signal 448, the output signal 446' corresponding increases in amplitude. Thus the relatively narrow gating signal 444 delivers an output signal corresponding in amplitude to the amplitude of the input signal to the gate 18 with respect to the time of its occurrence. When the relatively narrow gating signal 444" gates a signal 450 having a negative-going component and a positive-going component, the relative positions of the signals 444" and 450 determine the amplitude and polarity of the output signal. For instance, in this case the concurrence of the gating signal 444" with the negative component of the signal 450 results in a negative-going output signal 452.

When the gating signal 454 has a greater duration than the gating signal 444, an output signal results from the input signal 455 which may have a longer duration and provide at greater amplitude such as the signal 456. When the gating signal is of extended duration such as the pulse 458, the entire input signal 460 may be passed by the gate 18 as illustrated by 460' in FIGURE 6b.

The signal from the output terminal 202 of gate 18 is delivered to the signal averaging circuit 208 corresponding to the resistor 210 and shunt capacitor 212. Since the output signal from the gate 18 occurs at a repetition rate of 5 kilocycles, the averaging circuit 208 rapidly attains an average signal voltage which may graphically be represented in FIGURE 6c for the various signal amplitudes illustrated in FIGURE 6b. It is noted that the peak values attained by the averaging device 208 as well as the rate at which the final value is attained by the circuit 208 will depend upon its time constant. The signal developed corresponds with the amplitude of the input signal to the gate 18 and where the gate provides positive and negative signals the average value is provided. When the positive and negative components of the gated signal are equal as in the signal 460' of FIGURE 6b, the voltage delivered by the averaging circuit 208 is not affected by the signal from the gate 18. The importance of this characteristic will be explained in detail hereafter.

The signal developed by the averaging device 208 is delivered to the input of the differential direct current amplifier 218 which provides a highly stable amplification of low drift characteristic. The output signal $E_o$ delivered at the output terminals 342 and 344 of the amplifier 218 may be adjusted for zero input condition by the adjustment of the contact of the potentiometer 234 which is connected with the control electrode 232 of the valve 216.

The output signal $E_o$ of the amplifier 218 corresponds with the output signal from the averaging device 208.

From the foregoing description, the amplitude and polarity of the output signal $E_o$ may be utilized to determine the characteristics of the transistor 72 or any other such element which is being tested.

For instance, it is noted that with the transistor 72 having the minimum allowable characteristic such as rise time and delay time or the combination of both, the delay provided by the element 32 is adjusted to provide an output signal $E_o$ corresponding to a predetermined level. Referring to FIGURES 5a and 5b it will be noted that the relationship of the transistor pulse 424′ and the comparison pulse 402 provides output signals 430 and 432 having positive and negative components of equal duration so that zero output signal is provided. If the delay or rise time of the transistor pulse 424′ increases, a negative component of the output signal 430 will increase in amplitude. If the contact arm 348 of the selector switch is connected with the terminal 354, a current will pass through the activating coil 356 of the relay 358 resulting in the delivery of a signal to the output means 22. The output means 22 may be in the form of sorting device which will reject the transistor 72 under test. The variable resistor 346 may control the current to the relay 358, thereby determining the threshold voltage $E_o$ required to activate the relay 358. When the output means 22 is to be activated by the occurrence of a positive-going signal the contact arm 348 may be connected to the terminal 352, whereas when the amplitude irrespective of its polarity is to effect the actuation of the relay 358, the contact arm 348 is connected with the terminal 350 of the selector switch.

When transistor 72 is to be tested only with respect to a predetermined rise time represented by the signal 402 from the delay 32, delay element 32 may be adjusted so that the leading or trailing edges which are to be compared are in concurrence. This situation is illustrated in FIGURE 4. In this case, the output pulses will indicate whether the rise time of the pulse produced by the transistor 72 under test is greater than or less than that of the standard or test pulse 402 with which it is being compared. The corresponding output signal $E_o$ from the amplifier 218 may similarly be utilized to select or classify the transistor being tested. A plurality of output means may be actuated by a corresponding plurality of relay means associated with the output terminals 342 and 344 of the testing means for selecting and classifying the transistors according to a plurality of specifications.

The output means 22 may include a voltage to digital convertor as well as printing and graphic means for recording the characteristics of the devices being tested.

It is noted that by utilizing narrow gating signals from the valve 164 to the gate 18, the output characteristic of the transistor 72 may be particularly selected within a predetermined region rather than obtaining a result based upon the average of the output characteristics. This has been explained in connection with FIGURE 6. It is also noted that although the testing means is particularly described in connection with its utilization in testing a transistor, it may be utilized for comparing the output characteristics of various elements as well as comparing and providing information with respect to the relationship between a pair of pulse signals.

It will, of course, be understood that the description and drawings herein contained, are illustrative merely, and various modifications and changes may be made in the structure disclosed without departing from the spirit of the invention.

What is claimed is:

1. A testing means comprising a source of pulse signals, means for delivering pulse signals from said source to a device which is to be tested, a signal comparing means for securing and comparing signals from said source and from said device and directly comparing the waveforms of said signals and delivering an output signal, and a signal averaging network receiving the output signal from said comparing means and delivering an output signal.

2. A testing means comprising a source of signals, means for delivering signals from said source to a device which is to be tested, signal adjusting means excited by signals from said source, a signal adding means for receiving signals from said signal adjusting means and from said device and delivering an output comparison signal, a signal gate delivering a selected portion of the output signal from said adding means, and a signal averaging network receiving the signal from said gate and delivering an output signal.

3. A testing means comprising a source of signals, means for delivering signals from said source to a device which is to be tested, signal adjusting means excited by signals from said source, a signal adding means for concurrently receiving signals from said signal adjusting means and from said device and delivering output signals, one of said signals concurrently received by said adding means being inverted with respect to the other so that said adder provides a difference output signal, a signal gate activated by said source for delivering a selected portion of the output signal from said adding means, and a signal averaging network receiving the signal from said gate and delivering an output signal.

4. A testing means comprising a source of pulse signals, means for delivering pulse signals from said source to a device which is to be tested, signal delaying means having an input excited by pulse signals from said source and an output delivering said pulse signals, and signal adding means for receiving signals from the output of said delaying means, and from said device and adding said signals and delivering composite output signals, one of said signals concurrently received by said adding means being inverted with respect to the other before addition so that said adder provides a difference output signal as a composite signal.

5. A testing means comprising a source of pulse signals; first means for delivering pulse signals from said source to a device which is to be tested; signal delaying means excited by pulse signals from said source and delivering output signals after a predetermined delay time; and signal adding means having a first input receiving pulse signals from said delaying means, a second input for receiving inverted signals from said device and an output delivering difference signals.

6. The testing means of claim 5 in which said first means is a conductor for delivering signals from said source to a transistor which is to be tested.

7. A testing means comprising a single source of pulse signals, means for delivering pulse signals from said source to a device which is to be tested, signal comparing means for receiving signals from said source and from said device and directly comparing the waveforms of said signals and delivering output signals, and a signal selecting means receiving and controlling the delivery of output signals from said comparing means.

8. A testing means comprising a single source of pulse signals, means for delivering pulse signals from said source to a device which is to be tested, signal combining means for receiving signals from said source and from said device and combining said signals and delivering composite output signals, and a gating means delivering signals from said combining means which occur during selected time intervals.

9. A testing means comprising a single source of signals, means for delivering signals from said soure to a device which is to be tested, signal adjusting means excited by signals from said source, signal adding means for receiving signals from said signal adjusting means and from said device and delivering output comparison signals, and gating means excited by signals from said adjusting means for controllably delivering output signals from said adding means.

10. A testing means comprising a single source of signals, means for delivering signals from said source to a device which is to be tested, signal adjusting means excited by signals from said source, signal adding means for concurrently receiving signals from said signal adjusting means and from said device and delivering output signals, one of said signals concurrently received by said adding means being inverted with respect to the other so that said adder provides a difference output signal, and gating means excited by signals from said signal adjusting means for delivering a selected portion of the output signals from said adding means.

11. A testing means comprising a single source of signals, means for delivering signals from said source to a device which is to be tested, signal delaying means excited by signals from said source, signal adding means for receiving signals from said delaying means and from said device and delivering output signals, one of said signals concurrently received by said adding means being inverted with respect to the other so that said adder provides a difference output signal, and gating means excited by signals from said delaying means for delivering a selected portion of the output signals from said adding means.

12. A testing means comprising a single source of signals; first means for delivering signals from said source to a device which is to be tested; signal delaying means excited by signals from said source and delivering output signals after a predetermined delay time; signal adding means having a first input receiving the output signals from said delaying means, a second input for receiving inverted signals from said device, and an output delivering difference signals; and gating means excited by output signals from said delaying means for delivering selected portions of the output signals from said adding means.

13. The testing means of claim 12 in which said source provides pulse signals.

14. The testing means of claim 13 in which said first means is a conductor for delivering signals from said source to a transistor to be tested.

15. A testing comprising a source of signals, means for delivering signals from said source to a device to be tested, signal comparing means for receiving signals from said source and from said device and delivering output signals, control means excited by signals derived from said source and delivering differential output signals, and means activated by the output signals of said control means for delivering output signals from said comparing means.

16. A testing means comprising a source of pulse signals, means for delivering signals from said source to a device to be tested, signal combining means for receiving signals from said source and from said device and delivering an output signal, control means excited by signals derived from said source and delivering output pulses, and gating means activated by the output signals of said control means for selectively delivering predetermined signals from said combining means.

17. A testing means comprising a source of pulse signals, means for delivering signals from said source to a device to be tested, signal adjusting means excited by signals from said source and delivering output pulse signals, signal adding means for receiving signals from said signal adjusting means and from said device and delivering output comparison signals, control means excited by output pulse signals from said adjusting means and delivering leading and trailing output pulse signals, and gating means selectively activated by either of said leading and trailing output pulses of said control means for delivering output signals from said adding means.

18. A testing means comprising a source of pulse signals, means for delivering signals from said source to a device to be tested, signal adjusting means excited by signals from said source and delivering output pulse signals, signal adding means for concurrently receiving pulse signals from said signal adjusting means and from said device and delivering output signals, one of said pulse signals concurrently received by said adding means being inverted with respect to the other so that said adder provides a difference output signal, control means excited by output pulse signals from said adjusting means and delivering output pulse signals having a duration less than that of the difference output signals of said adding means, and gating means activated by said output pulse signals of said control means for delivering selected portions of said output signals from said adding means.

19. A testing means comprising a source of pulse signals; first means for delivering signals from said source to a device to be tested; signal delaying means excited by signals from said source and delivering output pulse signals after a predetermined delay time; signal adding means having a first input receiving the output signals from said delaying means, a second input for receiving inverted signals from said device, and an output delivering difference signals; control means excited by output pulse signals from said delaying means and delivering output pulse signals of adjustable duration less than that of the difference output signals of said adding means; and gating means activated by said output pulse signals of said control means for delivering selected portions of said output signals from said adding means.

20. The testing means of claim 19 including signal averaging means receiving the signals delivered by said gating means.

21. The testing means of claim 20 including an information output means delivering data derived from said signal averaging means.

22. The testing means of claim 21 in which said first means is a conductor for delivering signals from said source to a transistor to be tested.

23. A testing means comprising a source of pulse signals, first means for delivering pulse signals from said source to a device to be tested, second means receiving and delivering a signal characteristic of said device, and a signal averaging network receiving and averaging the output signal from said second means and delivering an averaged output signal.

24. The testing means of claim 23 in which said second means is a signal gate.

25. The testing means of claim 24 in which said gate is activated by signals derived from said source for delivering signals to said averaging network.

26. The testing means of claim 25 including a gate control means energized by signals from said source and delivering gating signals to said gate.

27. The testing means of claim 26 in which said gate control means provides a gating pulse of predetermined duration and wave form to said signal gate for controlling the delivery by said gate of a selected portion of the input signal received by said gate.

28. The testing means of claim 27 including a signal delaying means delivering signals from said source to said gate control means after a predetermined delay period.

29. A testing means comprising a source of cyclic signals, means for delivering signals from said source to a device which is to be tested, a signal combining means for receiving and combining signals from said source and from said device and delivering a composite output signal, and a signal averaging network receiving output signals from said signal combining means and averaging a selected portion only of the output signal from said combining means during each cyclic interval and delivering an averaged output signal.

References Cited in the file of this patent

UNITED STATES PATENTS

| | | |
|---|---|---|
| 1,596,942 | Nyquist et al. | Aug. 24, 1926 |
| 1,684,397 | Hubbard | Sept. 18, 1928 |
| 2,285,038 | Loreglin | June 2, 1942 |
| 2,722,659 | Dickey et al. | Nov. 1, 1955 |
| 2,793,343 | Wagner | May 1, 1957 |
| 2,794,952 | Golden et al. | June 4, 1957 |
| 2,830,265 | Ellison | Apr. 8, 1958 |
| 2,947,943 | Casey et al. | Aug. 2, 1960 |

UNITED STATES PATENT OFFICE

CERTIFICATE OF CORRECTION

Patent No. 3,074,017

January 15, 1963

David E. Sunstein et al.

It is hereby certified that error appears in the above numbered patent requiring correction and that the said Letters Patent should read as corrected below.

Column 4, line 52, for "204" read -- 294 --; line 60, the indistinct figure should be -- 334 --; column 5, line 64, for "the" read -- their --; column 6, line 24, for "siegnals" read -- signals --; column 7, line 46, after "gate" insert -- 18 --; line 55, for "deliveerd" read -- delivered --; column 10, line 22, after "means" strike out the comma; column 11, line 32, after "testing" insert -- means --.

Signed and sealed this 28th day of April 1964.

(SEAL)
Attest:
ERNEST W. SWIDER

Attesting Officer

EDWARD J. BRENNER
Commissioner of Patents